INVENTOR
ANDREW GABOR

BY Lane, Aitken, Dunner & Ziems
ATTORNEY

INVENTOR
ANDREW GABOR

BY
Lane, Aitken, Dunner & Ziems
ATTORNEYS

INVENTOR
ANDREW GABOR

BY Lane, Aitken, Dunner & Ziems
ATTORNEYS

INVENTOR
ANDREW GABOR

BY
Lane, Aitken, Dunner & Ziems
ATTORNEYS

INVENTOR
ANDREW GABOR
BY
Lane, Aitken, Dunner & Ziems
ATTORNEYS

United States Patent Office 3,427,605
Patented Feb. 11, 1969

3,427,605

APPARATUS AND METHOD FOR RECORDING CONTROL CODE BETWEEN DATA BLOCKS

Andrew Gabor, Huntington, N.Y., assignor to Potter Instrument Company, Inc., Plainview, N.Y., a corporation of New York Filed Oct. 8, 1965, Ser. No. 494,084
U.S. Cl. 340—174.1 17 Claims
Int. Cl. G11b *5/00;* G01d *15/12*

ABSTRACT OF THE DISCLOSURE

This specification discloses a magnetic storage system for storing information along magnetic tracks in a self-clocking non-return to zero mode. Means are provided to record a control code in the magnetic track between adjacent blocks of recorded information. The control code contains a pattern of flux transitions in which the number of adjacent short intervals which occur in a row is odd, which pattern cannot occur in the information recorded in the information blocks. Means are provided to read out the self-clocking, non-return-to-zero information and to separate the recorded clock pulses from the recorded information pulses. Means are also provided to recognize the control code recorded between the blocks of information.

This invention relates to the magnetic storage of information and more particularly to a self-clocking non-return-to-zero system for storing information in magnetic tracks, such as on magnetic tape, employing a unique control code to signal the beginning or end of a block of information.

In data processing equipment and computers the storage of information on magnetic tape has found wide application. In modern systems for storing information on magnetic tape the information is normally recorded in binary form in a plurality of parallel tracks. The information is usually recorded in the tracks in the non-return-to-zero mode, which means that each track is continuously magnetized in one direction or in the opposite direction with the direction of the flux being repeatedly reversed proceeding along the track to represent the recorded information. The reversal of flux in a track from one direction to the opposite direction is referred to as a flux transition. Each flux transition represents a recorded pulse. In some recording systems in order to permit a greater density of information stored in each track, clock pulses are recorded along with information pulses in each track. These systems are referred to as being self-clocking systems.

In self-clocking non-return-to-zero recording systems, a problem exists in the identification of the beginning or end of a block of information recorded serially along a track. As an example of a situation where serious problem of this kind is encountered is a serial self-clocking recording on a continuous loop of magnetic tape where the information is recorded in blocks of arbitrary length and the selective rewriting of any block, or group of blocks, a substantially unlimited number of times may be required. In such a system, unless the blocks are separated by some control signals which are never erased and which are recognized every time rewriting takes place, blocks may undergo a slight shift in position every time they are rewritten, ultimately resulting in a block shifting into and damaging an adjacent block.

Another example of control signals is the case where the self-clocking information is written with such a high density that because of inherent pulse crowding the signals at the beginning and end of a block assume unusual shapes. In order to "protect" the actual recording it is necessary to record some signals in addition to the legitimate information at both the beginning and the end of a block.

The identification of the beginning or end of a block of information is normally carried out by means of a control code. It is possible to use a unique combination of binary digits as the control code to identify the beginning or end of the block of information. However, since any combination of binary digits can occur in randomly recorded information, a control code made up of a unique combination of ones and zeros can be confused with the information actually recorded on the track.

Accordingly it has been the practice to use control codes which violate parity, which is a means of checking for errors in the recorded information. Hence a control code which violates parity should never occur in a recorded block of information. Such control codes however are confusable with errors in recorded information which violate parity.

The system of the present invention employs a control code which can never occur in the recorded block of information even as an error in the recorded information violating parity.

In the commonly used forms of self-clocking non-return-to-zero recording systems, flux transitions are separated either by a short interval of a predetermined length or by a long interval of a predetermined length. The present invention is based on the discovery that the number of short intervals that occur in a row along a track of recorded information is always even. The control code of the present invention comprises a series of flux transitions extending along the track spaced so that an odd number of short intervals in a row repeatedly occurs along the track.

In accordance with the method of the present invention this control code is recorded between blocks of information recorded in the track in accordance with a self-clocking non-return-to-zero recording system.

The arrangement of flux transitions of the control code of the present invention can never occur in a recorded block of information even as an error violating parity. Accordingly, the control code of the present invention can never be confused with the recorded information.

In accordance with the present invention means are provided to record information in accordance with a self-clocking non-return-to-zero recording system with means to record the control code of the present invention between the recorded blocks of information. Means are provided to read out the self-clocking non-return-to-zero information and to separate the recorded clock pulses from the recorded information pulses. Means are also provided to recognize the control code of the present invention and to provide a signal indicating that the control code is being read out.

Accordingly an object of the present invention is to provide an improved self-clocking non-return-to-zero system for recording binary information in a magnetic track.

A further object of the present invention is to provide a self-clocking non-return-to-zero system for recording binary information in a magnetic track employing a control code to identify the beginning or end of a block of information, which control code cannot be confused with the recorded information even if the recorded information contains an error violating parity.

A further object of the present invention is to provide an improved system for recording self-clocking binary information along a magnetic track.

A still further object of the present invention is to provide an improved system for reading out self-clocking binary information recorded along a magnetic track.

Further objects and advantages of the present invention will become readily apparent as the following detailed description of the invention unfolds and when taken in conjunction with the drawings, wherein.

Figure 3:
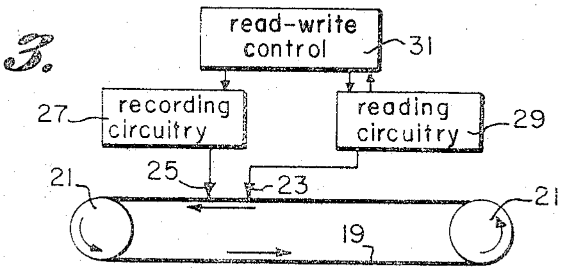
Figure 4:
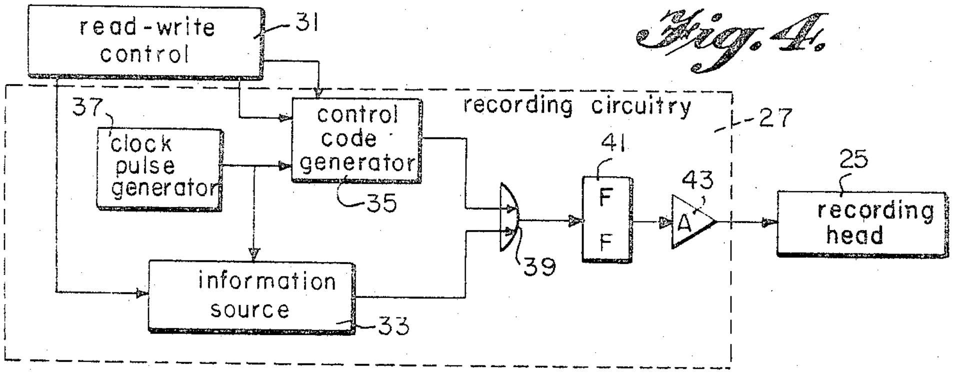
Figures 5, 7:
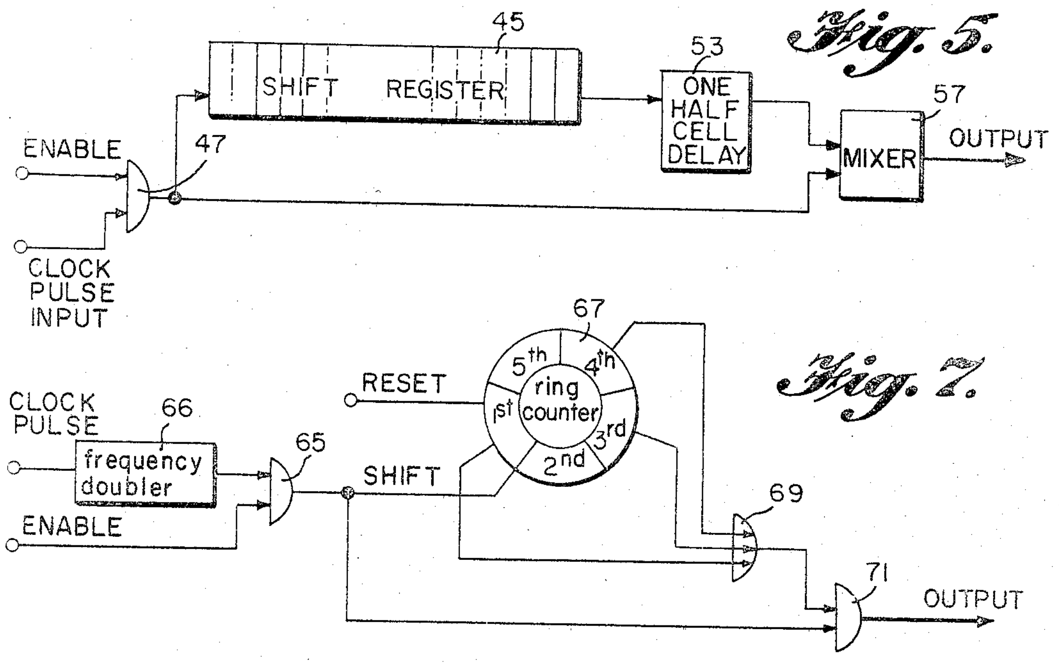
Figure 8:
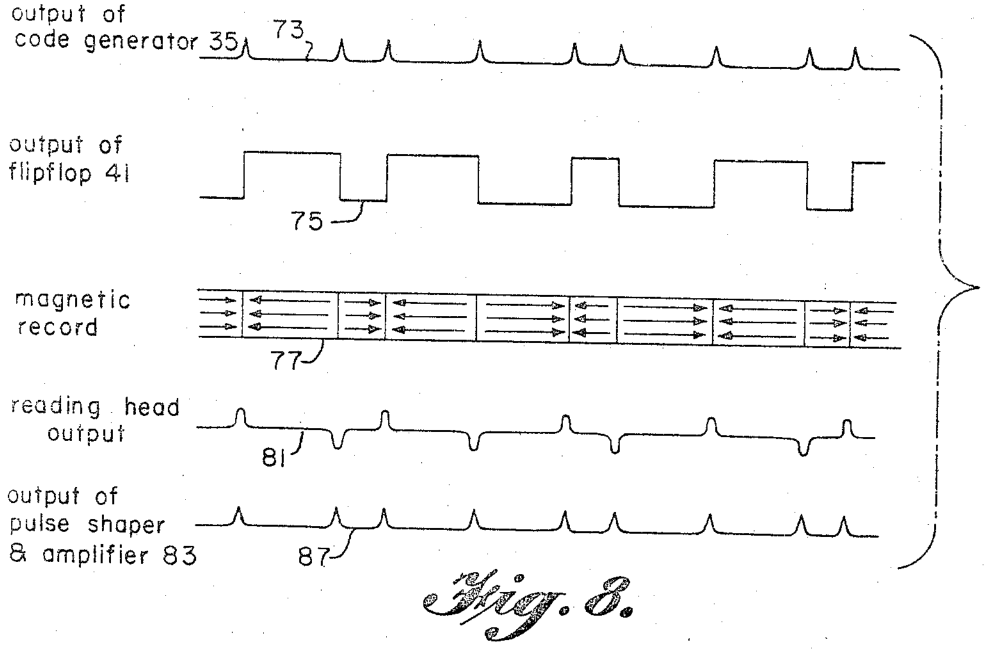
Figure 6:
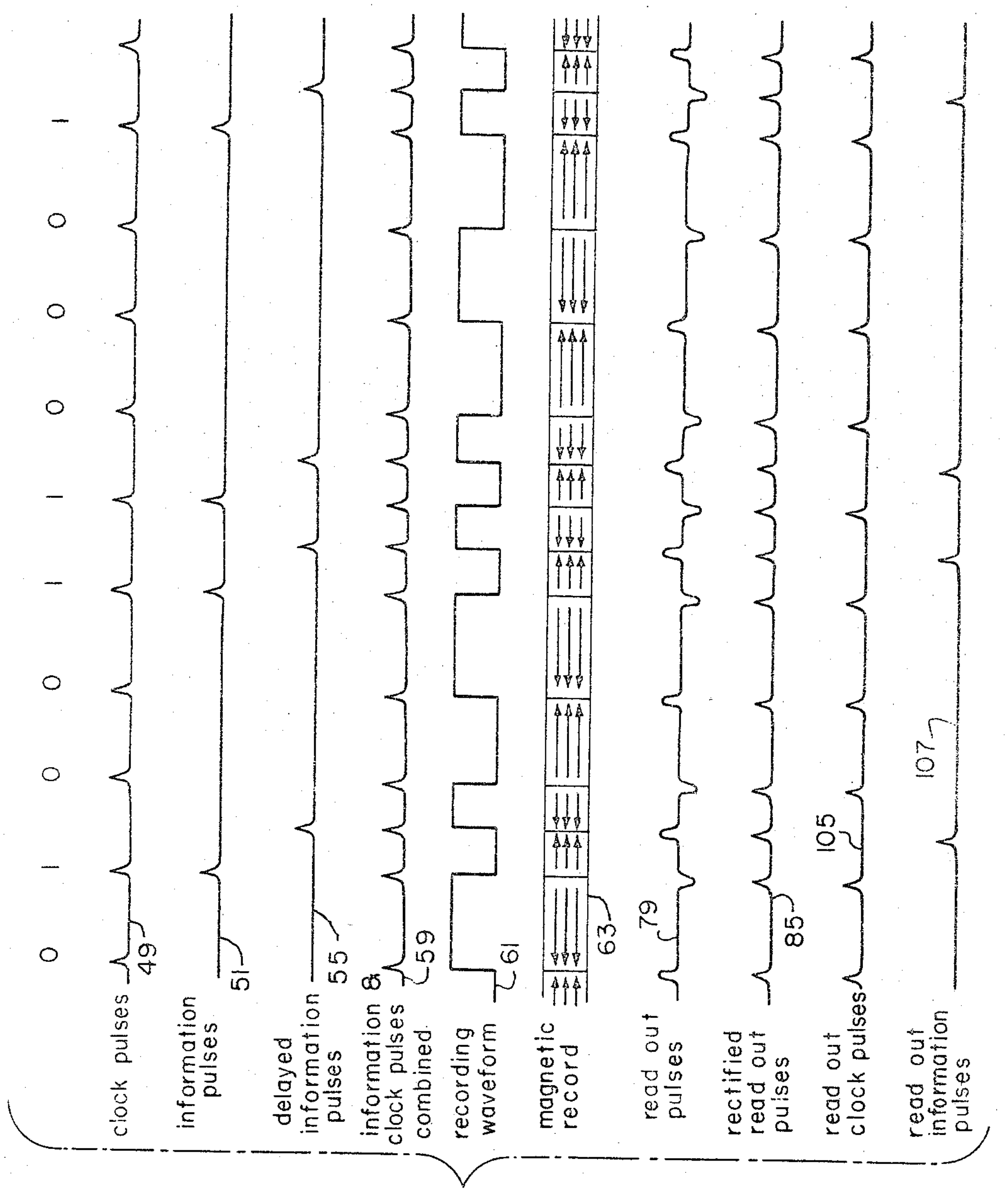
Figure 9:
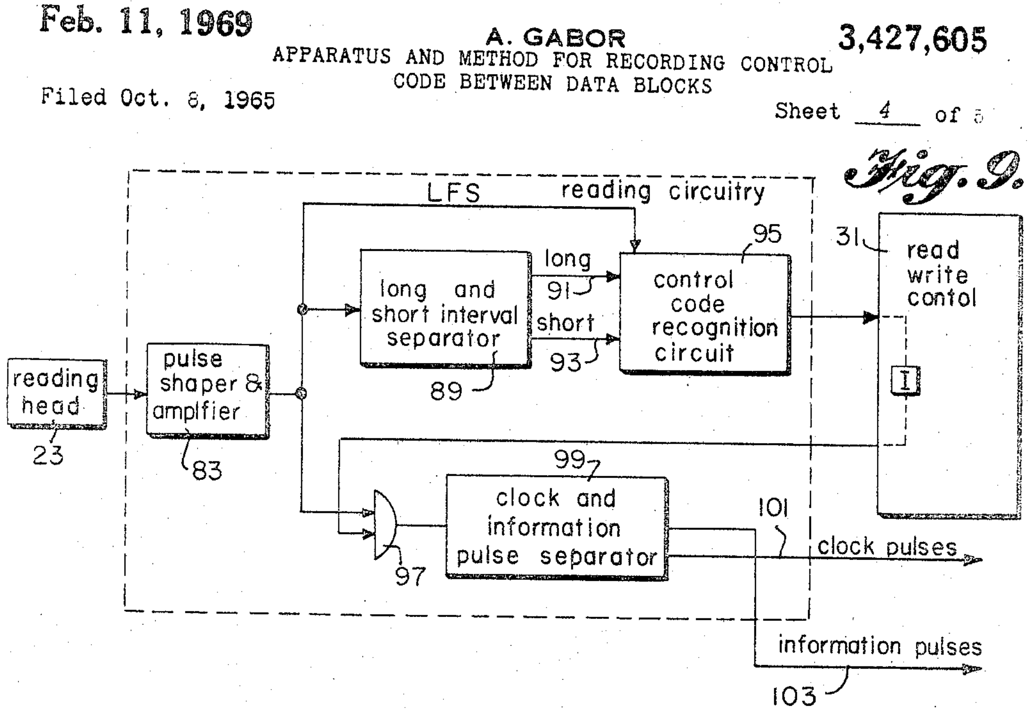
Figure 10:
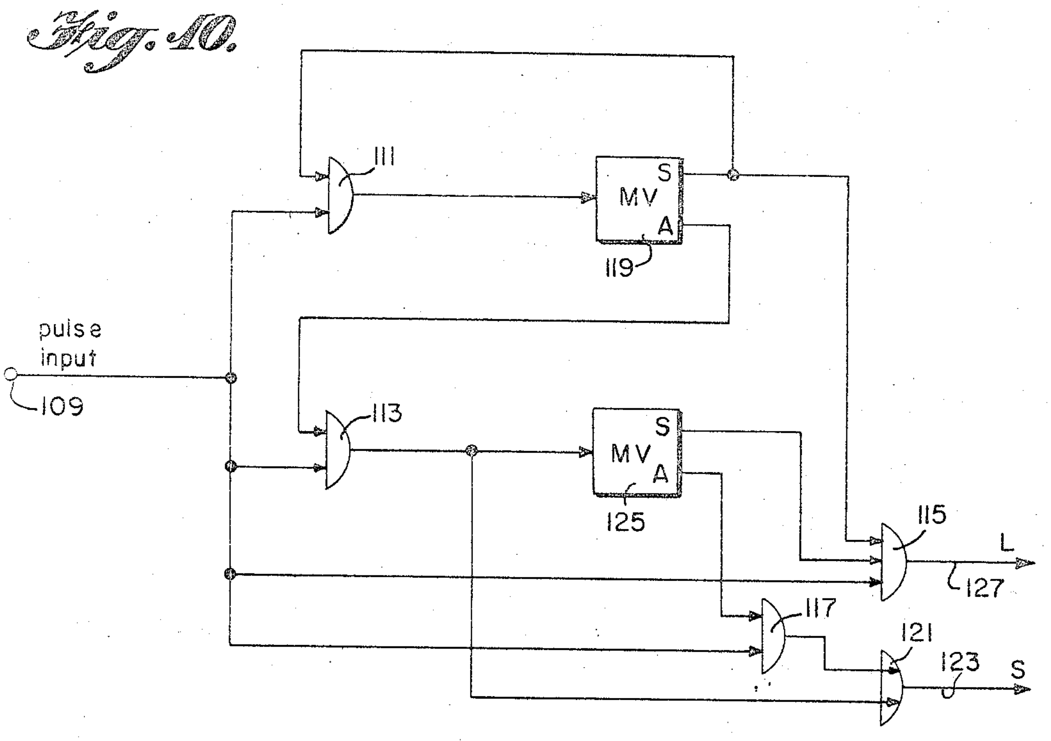
Figure 11:
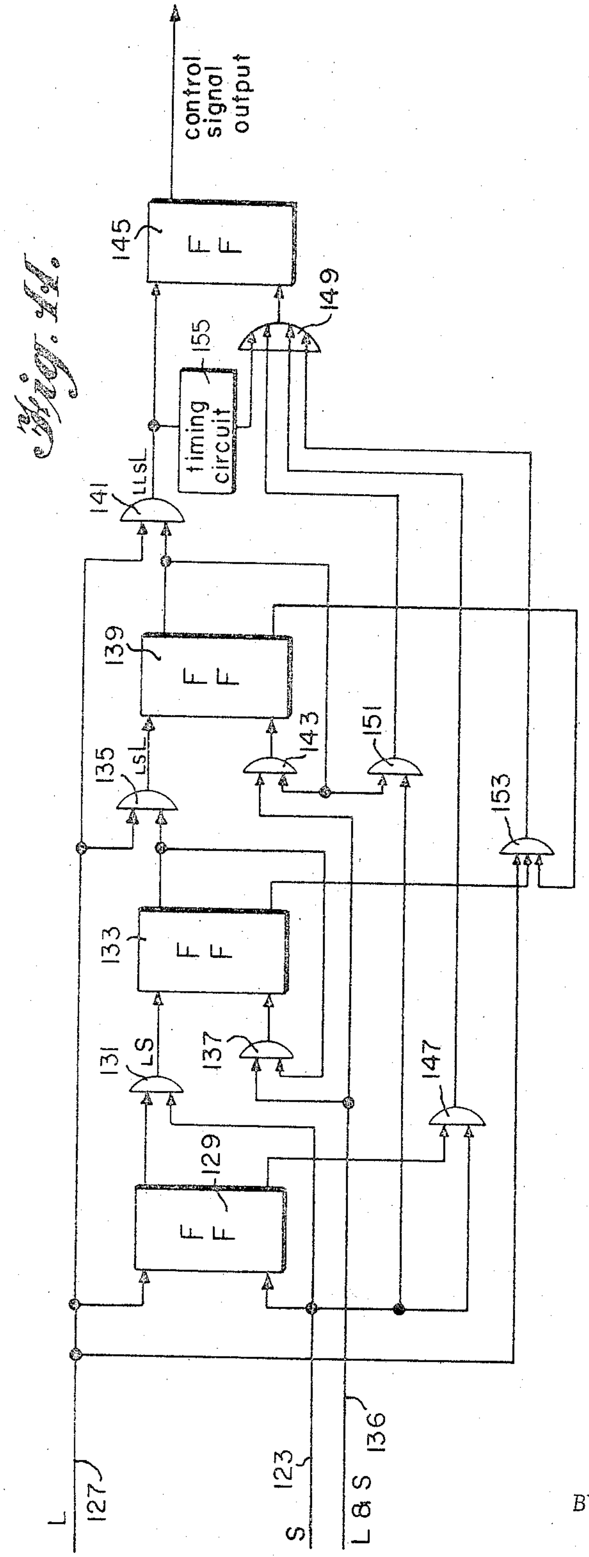
Figure 12:
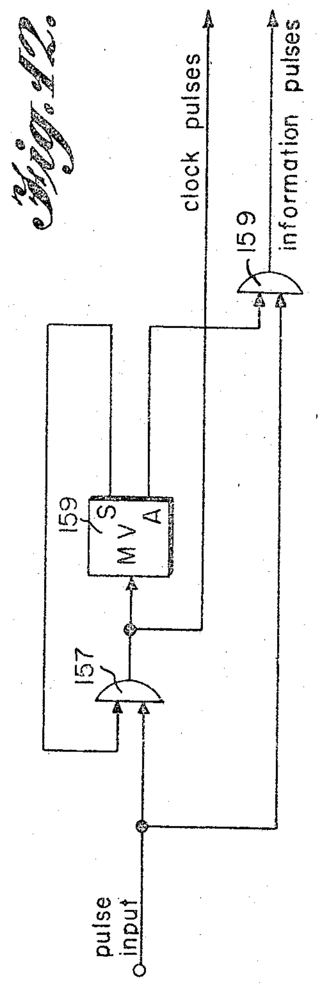

FIG. 3 schematically illustrates the overall magnetic storage system of the present invention;

FIG. 4 is a block diagram illustrating the recording circuitry of the present invention;

FIG. 5 is a block diagram illustrating the binary information source of the recording circuitry in greater detail;

FIG. 6 illustrates some wave forms produced by the magnetic storage system of the present invention in recording and reading out binary information;

FIG. 7 is a block diagram illustrating the control code generator of the recording circuitry in greater detail;

FIG. 8 illustrates some wave forms produced by the magnetic storage system of the present invention in recording and reading out the control code of the present invention;

FIG. 9 is a block diagram illustrating the readout circuitry of the present invention;

FIG. 10 is a block diagram illustrating the long and short interval separator of the readout circuitry in greater detail;

FIG. 11 is a block diagram illustrating the control code recognition circuit of the readout circuitry in greater detail; and FIG. 12 is a block diagram illustrating the clock and information pulse separator of the readout circuitry in greater detail.

Figure 1:
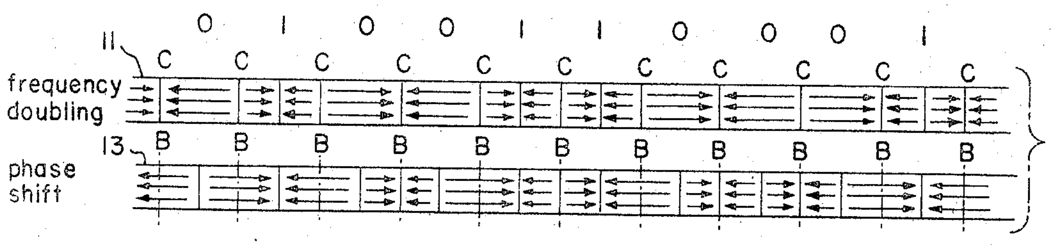
FIG. 1 illustrates magnetic tracks recorded in accordance with two forms of self-clocking non-return-to-zero recording systems.

FIG. 1 illustrates the two well-known self-clocking non-return-to-zero systems for recording on magnetic tracks. The two systems are designated as "frequency doubling" and "phase shift" respectively. The track 11 illustrates recording in accordance with the frequency doubling system and the track 13 illustrates recording in accordance with the phase shift system. The two tracks 11 and 13 as illustrated are a record of the same binary information, which is the row of binary digits shown at the top of FIG. 1. In tracks 11 and 13 the arrows indicate the direction that the track is magnetized and the lines between oppositely directed arrows represent flux transitions, where the flux is reversed from one direction to the opposite direction.

As shown in track 11 in the frequency doubling system flux transitions are recorded at regular intervals along the track to represent clock pulses. These flux transitions in track 11 are designated by the letter C directly above the track 11. Between each adjacent pair of flux transitions which represent clock pulses there is an information cell, in which a binary digit is stored. A binary zero is stored in the information cell between a pair of adjacent clock pulse representing transitions by the absence of a flux transition in the middle of the cell and a binary 1 is stored in an information cell by the presence of a flux transition in the middle of the cell. Accordingly a flux transition is recorded in each cell in track 11 situated below a binary 1 at the top of FIG. 1 and no flux transition is recorded in each cell below a binary zero at the top of FIG. 1. In this manner the binary digits at the top of FIG. 1 are recorded in track 11.

The same binary information recorded in track 11 in recorded in track 13 in accordance with the phase shift system. The track 13 is divided into binary information cells, the boundaries between which are delineated by means of the imaginary dashed lines designated by the leter B. Into each one of the binary information cells a binary 1 or binary 0 is recorded. A binary 1 is recorded by a change of flux in one direction and a binary 0 is recorded by a change of flux in the opposite direction. A flux transition is also recorded at the boundary between cells only if necessary to bring the flux to the proper polarity in the first half of the next succeeding cell to record the desired digit in the next succeeding cell. Thus a flux transition will be recorded only at those boundaries between adjacent cells which contain the same binary digit. Since a flux transition will be recorded in the middle of each information cell the flux transitions in the middle of the cell represent both the information recorded and the clock pulses for the information.

Figure 2:
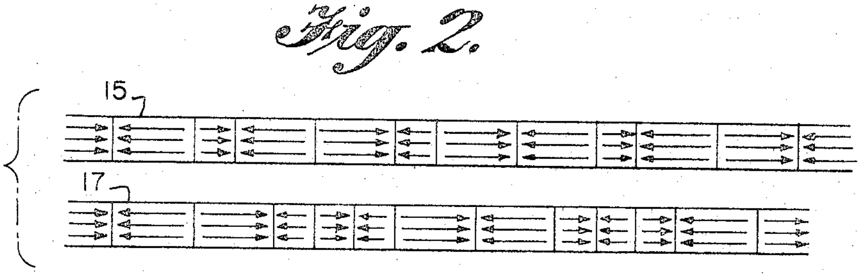
FIG. 2 illustrates two magnetic tracks containing two alternative control codes recorded in accordance with the present invention.

In both of the systems of FIGS. 11 and 13 it will be noted that the intervals between successive flux transitions is either a long interval equal to the width of the information cell or a short interval equal to one half the width of the information cell. It will also be noted that the number of short intervals that occur in a row is always even. Accordingly a control code containing an odd number of short intervals in a row recorded in the track could not be confused with information recorded in the track. FIG. 2 illustrates two such control codes.

In track 15 of FIG. 2 a pattern of flux transitions is recorded in which one short interval between flux transitions is followed by two long intervals between successive flux transitions. This pattern is repeated along the track. In track 17 another control code is illustrated in which the pattern of flux transitions comprises three short intervals between successive flux transitions followed by two long intervals between successive flux transitions. This pattern is repeated along the length of track 17.

It will be understood that any pattern of flux transitions may be used as a control code, as long as the number of short intervals in a row between successive flux transitions in the pattern is odd. In the specific embodiment of the present invention the control code illustrated in track 15 is used and the information is recorded in accordance with the frequency doubling system illustrated in track 11 of FIG. 1.

In accordance with the present invention the control code is used to separate adjacent blocks of recorded information and thus designates the end of one block and the beginning of the next block. Instead of using a single control code to designate the end and beginning of information blocks, a different code could be used for designating the beginning of an information block than is used for designating the end of an information block.

As shown in FIG. 3, which schematically illustrates the overall system of the present invention, a magnetic tape loop 19 is supported between two pulleys 21, which drive the tape loop at a constant rate of speed past a reading head 23 and a recording head 25. The recording head 25 under the control of recording circuitry 27 is operable to record in a track on the tape loop 19 as the tape is driven past the recording head 25 by the pulleys 21. The recording circuitry 27 is operable to apply a wave form to the recording head 25 so that binary information is recorded in accordance with the frequency doubling system described above with respect to track 11 in FIG. 1. The reading head 23 is positioned to read out the signals recorded in the same track in which the recording head 25 is operable to record. The signals read out by the reading head are applied to reading circuitry 29.

For purposes of simplicity only a single recording head and a single reading head are shown for recording on the tape loop 19. It will be understood that additional heads and circuitry could be provided for recording in parallel tracks on the tape loop 19. Moreover, instead of using separate heads for reading and recording, a single head can be used for both functions.

The recording circuitry 27 and the reading circuitry 29 are under the control of Read Write control 31, which can enable the reading circuitry 29 to receive the self-clocking information signals read out by the reading head 23 or it can enable the recording circuitry 27 to apply signals to the recording head 25 to be recorded.

The Read Write control 31 can be operated to cause the recording circuitry to operate in two different modes. In one mode of operation the recording circuitry applies signals to the recording head to record blocks of information in accordance with the frequency doubling system and to record between the blocks of information the control code as described above with respect to track 15 in FIG. 2. In the other mode of operation, which is designed to be used when the control code has already been recorded on the track and it is desired to record in the blocks between the postions in which the control code is recorded, the Read Write control 31 enables the recording circuitry to record only when the control code is not being read out by the reading head. In this mode of operation the reading circuitry 29 will apply a signal to the Read Write control 31 whenever the reading head 23 is reading out the control code and the Read Write control 31 will enable the recording circuitry only when it is not receiving this signal from the reading circuitry.

As shown in FIG. 4 the recording circuitry comprises an information source 33, a control code generator 35, and a clock pulse generator 37, which applies clock pulses to both the control code generator and the information source. When the Read Write control 31 applies an enabling signal to the information source 33 pulses will be produced from the information source 33 under the control of pulses from the clock pulse generator 37 and the pulses from the information source will pass through an OR gate 39 to a flipflop 41. Each pulse applied to the flipflop 41 through the OR gate 39 will cause the flipflop 41 to switch to its opposite state. As a result the flipflop 41 will produce a square wave output, which is amplified by an amplifier 43 and then applied to the recording head 25. The pulses produced by the information source 33 will be timed relative to one another so that the flipflop 41 will apply a signal to the recording head 25 to record the binary information stored in the information source 33 in accordance with the frequency doubling system described above.

When the Read Write control 31 applies an enabling signal to the control code generator 35, the control code generator 35 under the control of pulses from the clock pulse generator 37 will produce output pulses which are applied through the OR gate 39 to the flipflop 41. Accordingly, each output pulse of the control code generator 35 will cause the flipflop 41 to switch to its opposite state. The pulses produced by the control code generator 35 are timed relative to one another so that the resulting square wave signal applied to the recording head 25 by the flipflop 41 will cause the recording head 25 to record the control code illustrated in track 15 of FIG. 2.

In the mode of operation in which the recording circuitry is to record binary information in blocks and record the control code between the recorded blocks of information, the Read Write control will apply an enabling signal to the information source 33 to enable it to produce output pulses so that a block of the information desired to be recorded is recorded. When the block of information has been recorded, the Read Write control 31 will remove the enabling signal from the information source 33 and apply an enabling signal to the control code generator 35. Thereupon, the control code generator 35 will produce output pulses to cause the control code to be recorded. When the next block of information is ready to be recorded the Read Write control 31 will remove the enabling signal from the control code generator 35 and apply an enabling signal to the information source 33 so that the next block of information is recorded. In this manner, information is recorded in the track in blocks with the blocks of information separated by the control code.

The information source 33 is illustrated in more detail in FIG. 5. As shown in FIG. 5 the information source comprises of shift register 45, in which is stored the binary information to be recorded in a block. Clock pulses from the clock pulse generator 37 are applied to a gate 47, which is connected to receive the enabling signal applied to the information source 33 from the Read Write control 31. When the Read Write control 31 applies an enabling signal to the information source 33, calling for the information stored in the shift register 45 to be recorded, the gate 47 will be enabled and clock pulses from the clock pulse generator will pass through the gate 47 and be applied to the shift input of the shift register 45. In response to the clock pulses applied to the shift register, the binary digits stored in the shift register are read out in sequence with one digit being read out with each applied clock pulse. If the digit being read out is a 1, the shift register will produce an output pulse in response to the applied clock pulse, and if the digit being read out is a 0, then the shift register will not produce an output pulse in response to the applied clock pulse. Thus the presence of an output pulse from the shift register at the time of occurrence of a clock pulse represents a binary 1 and the absence of an output pulse from the shift register at the time of occurrence of a clock pulse represents a zero.

FIG. 6 illustrates wave forms that are produced in the information source 33 when the binary number

0100110001 is read out from the shift register as an example. The top row of FIG. 6 is the binary number stored in the shift register. The wave form 49 is a series of clock pulses applied to the shift input of the shift register through the gate 47. The wave form 51 comprises the information pulses produced at the output of the shift register 45 in response to the applied input pulses. As can be observed in FIG. 6 a pulse is produced in the wave form 51 at the time of occurrence of a clock pulse to represent a binary 1, whereas the absence of a pulse at the time of occurrence of a clock pulse represents a binary 0.

The output pulses of the shift register 45 are referred to as information pulses. These pulses are delayed by a time interval equal to one half the time between successive clock pulses by a delay means 53. The delay provided by the delay means 53 is referred to as a one half cell delay. The resulting output wave form produced from the delay means 53 is represented by the wave form 55 in FIG. 6. The output of the delay means 53 is combined with the clock pulses passing through the gate 47 in a mixer 57 so that the clock pulses and information pulses are produced in a single channel. The resulting wave form that is produced in represented in FIG. 6 by the wave form 59.

In the wave form 59 the clock pulses occur at regular intervals and information pulses occur between some of the pairs of adjacent clock pulses. In the wave form 59 a binary information cell, in which a binary information digit can be represented, in the time interval between each pair of adjacent clock pulses. A 1 is represented in the wave form 59 by the presence of a pulse between an adjacent pair of clock pulses, and a 0 is represented in the wave form 59 by the absence of a pulses between an adjacent pair of clock pulses.

The clock pulses and information pulses in the wave form 59 are distinguishable only by their time of occurrence relative to the preceding clock pulse. If a pulse coming after a clock pulse occurs after a short time interval, the pulse is an information pulse representing a 1, and if a pulse coming after a clock pulse is after a long interval, then the pulse is another clock pulse. The next pulse after an information pulse is always a clock pulse.

The wave form 59 after being produced by the mixer 57 will pass through the OR gate 39 as shown in FIG. 4 and then be applied to the flipflop 41. The flipflop 41 will switch to its opposite state in response to each applied input pulse and as a result will produce wave form 61. This wave form is then amplified by the amplifier 43 and applied to the recording head 25.

The positive going square wave peaks of the wave form 61 applied to the recording head 25 will cause the recording head to magnetize the track in one direction and the negative going square wave peaks will cause the recording head to magnetize the track in the opposite direction. Accordingly, as the track moves past the head at a constant speed, a flux transition will be recorded at the time of each transition of the wave form 61 from a square wave peak of one polarity to a square wave peak of the opposite polarity. As a result the recording head 25 will record in the track passing by on the tape loop 19 the record illustrated in track 63 in FIG. 6. It will be noted that the record in track 63 is identical to the record in track 11 in FIG. 1 and thus the record in track 63 will represent the binary number 0100110001 in the frequency doubling non-return-to-zero self-clocking system.

FIG. 7 illustrates the details of the control code generater 35. As shown in FIG. 7 the enabling signal applied to the control generator 35 is applied to a gate 65 to enable the gate 65. The clock pulses produced by the clock pulse generator 37 are applied to a frequency doubler 66, which applied pulses at twice the clock pulse frequency to the gate 65. When the gate 65 is enabled in response to the enabling signal applied from the Read Write control 31 the pulses from the frequency doubler 66 will pass through the gate 65 and be applied to the shift input of a ring counter 67.

The ring counter has five stages and activates each stage in sequence in response to each applied pulse applied to its shift input and cyclically repeats the sequence. The ring counter 67 may for example be a shift register in which a 1 is stored in a single stage with the last stage of the shift register connected to feed back into the input of the first stage. As the pulses are applied to the shift input of the ring counter the binary 1 is shifted from stage to stage to activate the stages in sequence.

The 1st, 3rd and 4th stages of the ring counter have output channels and each of these stages applies an enabling signal to its output channel when such stage is activated. The enabling signals produced on the output channels of the 1st, 3rd and 4th stages of the ring counter 67 are connected through an OR gate 69 to enable a gate 71. The double frequency pulses passing through the gate 65 are also applied to the gate 71 and will pass through the gate 71 when it is enabled.

When the enabling signal from the Read Write control 31 is first applied to the gate 65, the ring counter 67 will have been reset so that its first stage is the stage that is activated. The resetting of the ring counter 67 is accomplished by means of a reset signal applied to the ring counter 67 from the Read Write control 31. Accordingly when the first pulse passes through the gate 65, the gate 71 will be enabled by a signal from the first stage of the ring counter 67. Accordingly the first pulse passing through the gate 65 will also pass through the enabled gate 71. The first pulse passing through the gate 65 will also shift the ring counter 67 to activate the second stage of the ring counter 67 so that when the second pulse passes through the gate 65, the gate 71 will no longer be enabled. The second pulse passing through the gate 65 shifts the ring counter to activate its third stage so that the third pulse passing through the gate 65 will find the gate 71 enabled and accordingly will pass through the gate 71. Similarly the fourth pulse will pass through the gate 71 but the fifth pulse will not. When the sixth pulse passes through the gate 65, the ring counter 67 will be back in the condition in which its first stage is activated so the sixth pulse will pass through the gate 71 and the cycle will be repeated.

The resulting wave form that is produced at the output of the gate 71 is illustrated in FIG. 8 designated by the reference number 73. As shown in the wave form 73, the output of the gate 71 which is the output of the code generator 35 consists of a series of pulses which are separated either by the time interval between clock pulses produced by the clock pulse generator 37 or by an interval equal to one half of this time interval. The intervals occur in the sequence of two long intervals followed by a single short interval, which sequence is cyclically repeated.

Because of the fact that the ring counter 67 is set to initially activate its first stage, the interval following the first output pulse is a long interval and the interval after the second pulse is a short interval. Then come the two long intervals of the regular sequence. The code generator 35 will continue to produce output pulses in this pattern for as long as the enabling signal is applied to the gate 65.

The output pulses of the code generator 35 are applied through the OR gate 39 to the flipflop 41 and each pulse applied to the flipflop 41 will cause the flipflop 41 to switch to its opposite state. Accordingly the flipflop 41 will produce the output wave form 75 illustrated in FIG. 8. This wave form upon being applied to the recording head 25 will cause the recording head 25 to record a pattern as illustrated on track 77 in FIG. 8.

As shown in the track 77 flux transitions are recorded in the cyclically repeating pattern of a single short interval between flux transitions followed by two long intervals between flux transitions. In this manner the pattern of the control code described with respect to track 15 of FIG. 2 is recorded in the track of the tape loop 19.

Thus in response to an enabling signal applied to the control code generator 35 by the Read Write control 31, the control code is recorded in the track, and in response to the enabling signal applied to the information source 33 by the Read Write control 31, binary information is recorded in the track in the self-clocking non-return-to-zero frequency doubling system. Thus the Read Write control 31 by selectively applying the enabling signal to the control code generator 35 and to the information source 33 can effect the recording of binary information in accordance with the frequency doubling system in blocks separated by the control code of track 15 shown in FIG. 2.

When the recorded information is read out by the reading head 23, the reading head will produce a series of output pulses alternating in polarity. Each pulse will be produced as a result of a flux transition passing under the reading head so that one pulse will be produced by the reading head for each recorded flux transition. Since the flux transitions are separated in the track either by a long interval or a short interval and since the tape is driven by the reading head at a constant rate, the pulses produced by the reading head will be separated by either a long time interval or a short time interval corresponding to the spacing of the flux transitions on the tape. The wave form 79 in FIG. 6 illustrates the pulse train that will be produced by the reading head 23 as the record of binary information illustrated in track 63 of FIG. 6 passes by the reading head. The wave form 81 in FIG. 8 illustrates the train of pulses that will be produced by the reading head when the record of the control code shown in track 77 of FIG. 8 is passed by the reading head.

As shown in FIG. 9 the pulse train produced by the reading head 23 is applied to a pulse shaper and amplifier 83, which full-wave rectifies the pulses, sharpens them to a narrow width, and makes them all of a standard size. Thus when the wave form 79 is applied to the wave shaper and amplifier 83, the wave shaper and amplifier 83 will produce the wave form 85 shown in FIG. 6, and when the wave form 81 of FIG. 8 is applied to the amplifier and wave shaper 83, the wave form 87 of FIG. 8 will be produced. It will be noted that the wave form 85 is a duplicate of the wave form 59, which is the output of the information source 33, and that the wave form 87 is a duplicate of the wave form 73, which is the output of the control code generator 35.

It also will be noted that adjacent pulses in the wave form 85 and 87 are separated by a long interval or a short interval. Since the tape loop is driven at the same speed when the tape is being read out as when it is being recorded upon, the long time interval is equal to the time interval between clock pulses produced by the clock pulse generator 37 and the short time interval is equal to one half the time interval between clock pulses.

The pulse train produced by the pulse shaper and amplifier 83 is applied to a long and short interval separater 89, which separates the pulses into those preceded by a long interval which are produced on a channel 91 and those which are preceded by a short interval which are produced on a channel 93. The pulses produced on channels 91 and 93 as well as the output pulses of the pulse shaper and amplifier 83 are applied to a control code recognition circuit 95. The control code recognition circuit 95 is designed to detect whether or not the pulses applied thereto are in the pattern of a single pulse applied over channel 93 followed by two pulses applied over channel 91 cyclically repeated. This is the pattern of pulses that will be applied to the control code recognition circuit when the pulse train 87 is being produced at the output of the pulse shaper and amplifier 83 as a result of the control code illustrated in track 77 of FIG. 8 being read out by the reading head. In response to detecting this pattern, the control code recognition circuit 95 will apply a signal to the Read Write control 31, indicative of the fact that the control code is being read out.

The Read Write control 31 will apply an enabling signal to a gate 97 except when it is receiving a signal from the control code recognition circuit 95 indicating that a control code is being read out. The gate 97 is also connected to receive the pulses produced by the pulse shaper and amplifier 83. When gate 97 is enabled the pulses from the pulse shaper and amplifier 83 will represent recorded information. These pulses will pass through the enabled gate 97 to the clock and information pulse separator 99, which separates the clock pulses from the information pulses and produces the clock pulses on an output channel 101 and the information pulses on output channel 103.

When the wave form 85 of FIG. 6 passes through the gate 97 to the clock and information pulse separator 99, the clock pulses in the wave form 85 will be produced on the channel 101 in the form of the wave form 105 and the information pulses in the wave form 85 will be produced on the channel 103 in the form of the wave form 107. From the wave form 107 in combination with the wave form 105 the binary information can be determined, as the presence of a pulse between two adjacent clock pulses will indicate a binary 1 and the absence of a pulse between two adjacent clock pulses will indicate a binary 0. It will be noted that the wave forms 105 and 107 are identical to the wave forms 49 and 55 from which the magnetic record of the binary code, as illustrated in track 63 of FIG. 6, was produced.

The details of the long and short interval separator 89, which separates the applied pulses into those preceded by a long interval and those preceded by a short interval is illustrated in FIG. 10. As shown in FIG. 10 the input of the separator, which is connected to receive the output pulses of the pulse shaper and amplifier 83, is designated by the reference number 109. The pulses applied to the input 109 are applied to gates 111, 113, 115, and 117.

The gate 111 will be normally enabled by an output signal from a monostable multivibrator 119, which applies enabling signal to the gate 111 when it is in its stable state. Accordingly the first pulse output of the pulse shaper and amplifier 83 will pass through the gate 111 whereupon the pulse will be applied to the multivibrator 119. The multivibrator 119 upon receiving a pulse from gate 111 switches temporarily to its astable state, whereupon it no longer enables the gate 111 and applies an enabling signal to the gate 113. The monostable multivibrator 119 will remain in its astable state for a time period greater than one half the time interval between clock pulses but less than the interval between clock pulses. Accordingly, if the next pulse applied to the input 109 occurs after a short time interval, the multivibrator 119 will still be in its astable state and the gate 113 will be enabled, whereas, if the next pulse applied to the gate 109 is preceded by a long time interval, the multivibrator will have switched back to its stable state and will enable the gate 111. Accordingly if the second pulse applied in the input 109 is preceded by a short interval the gate 113 will be enabled at the time the pulse is applied, whereas, if the second pulse applied to the input 109 is preceded by a long interval, the gate 111 will be enabled at the time the pulse is applied.

Thus it will be seen that when any pulse applied to the input 109 is preceded by a long interval the gate 111 will be enabled. Accordingly any pulse preceded by a long interval will pass through the gate 111 to the input of the multivibrator 119. Likewise any pulse preceded by a short interval following a pulse preceded by a long interval will find the gate 113 enabled and accordingly such a pulse will pass through the gate 113. Moreover, the only pulses that will pass through the gate 113 will be pulses that are preceded by a short interval. Accordingly the output of the gate 113 is connected through an OR gate 121 to an output channel 123 on which all the pulses preceded by a short interval applied to the input 109 are to be produced.

A pulse passing through the gate 113 is also applied to a monostable multivibrator 125, which in response to receiving a pulse passing through the gate 113 will be switched to its astable state for a short period of time during which it will enable the gate 117. The monostable multivibrator 125 will remain in its astable state for a period of time equal to the time period that the multivibrator 119 remains in its astable state. Accordingly if the next pulse applied to the input 109 following a pulse passing through the gate 113 is preceded by a short time interval, the gate 117 will be enabled and this pulse will pass through the gate 117. A pulse upon passing through the gate 117 will pass through the OR gate 121 to the output channel 123.

Thus it will be seen that all pulses preceded by a short interval following a pulse passing through the gate 111 will pass through the gate 113 and from there through the OR gate 121 to the output channel 123 and all pulses preceded by a short interval following a pulse passing through the gate 113 will pass through the gate 117 and from there through the OR gate 121 to the output channel 123. Since the monostable multivibrator 119 always will either enable the gate 111 or the gate 113, all pulses applied to the input 109 will either pass through the gate 111 or through the gate 113. Accordingly, all pulses applied to the input 109 preceded by a short interval will be produced in the output channel 123.

The gate 115 is connected to receive an enabling signal from the monostable multivibrator 125 when it is in its stable state and is connected to receive an enabling signal from the monostable multivibrator 119 when this multivibrator is in its stable state. The gate 115 will be enabled to pass pulses from the input 109 only when it receives enabling signals from both the monostable multivibrators 119 and 125. Since both the monostable multivibrators 119 and 125 will remain in their astable states for a period less than the interval between clock pulses, both of the monostable multivibrators 119 and 125 will be in their stable states whenever a pulse preceded by a long time interval is applied to the input 109. Accordingly, whenever a pulse preceded by a long time intervals is applied to the input 109, the gate 115 will be enable and such a pulse will pass through the gate 115 to an output channel 127, on which the pulses preceded by long time intervals applied to the input 109 are to be produced.

The block diagram of FIG. 11 illustrates the details of the code recognition circuit 95. As shown in FIG. 11 the pulses produced on channel 127 preceded by a long time interval are applied to a flipflop 129 to set the flipflop 129 in its ONE state, and the pulses preceded by a short time interval produced on channel 123 are applied to the flipflop 129 to set the flipflop 129 in its ZERO state. When the flipflop 129 is set in its ONE state it will enable a gate 131, which is connected to receive the pulses preceded by a short time interval produced on channel 123. When the gate 131 is enabled, any pulses applied to channel 123 will pass through the enable gate 131 to set a flipflop 133 to its ONE state. Accordingly a pulse will pass through the gate 131 to set the flipflop 133 to its ONE state only if the pulse on channel 123 is the next succeeding pulse after a pulse produced on channel 127. Accordingly the flipflop 133 will be set to its ONE state only if a pulse preceded by a long interval is immediately followed by a pulse preceded by a short interval.

The flipflop 133, when it is in its ONE state, will enable a gate 135, which is connected to receive the pulses produced on channel 127. The output pulses of the pulse shaper and amplifier 83, that is pulses preceded by both long and short intervals are applied over a channel 136 to a gate 137, which will be enabled when the flipflop 133 is in its ONE state. Pulses passing through the enabled gate 137 will set the flipflop 133 back to its ZERO state. Thus the flipflop 133 will remain in its ONE state and enable the gate 135 only until the next pulse is produced on channel 136. If the next pulse is preceded by a long time interval, it also will be produced on channel 127 and will find the gate 135 enabled. It will then pass through the gate 135 to set a flipflop 139 to its ONE state. Accordingly the flipflop 139 will be set into its ONE state only if pulses are produced by the pulse shaper and amplifier 83 in the sequence of a pulse preceded by a long interval followed by a pulse preceded by a short interval followed in turn by a pulse preceded by a long interval.

When the flipflop 139 is set in its ONE state will enable a gate 141 and a gate 143. The gate 143 is connected to receive the pulses on channel 136 and pulses passing through the gate 143 will set the flipflop 139 back to its ZERO state. Thus the flipflop 139 after being set in its ONE state will be set back to its ZERO state by the next pulse produced by the pulse shaper and amplifier 83. The gate 141 is connected to receive the pulses produced on channel 127 and accordingly, if the next pulse following the setting of the flipflop 139 into its ONE state is preceded by a long interval, this pulse will find the gate 141 enabled and will pass through the gate 141 to set a flipflop 145 in its ONE state. Accordingly a pulse will pass through the gate 141 and the flipflop 145 will be set in its ONE state only if pulses are produced in the sequence of a pulse preceded by a long interval followed by a pulse preceded by a short interval followed by two pulses each preceded by long intervals. This sequence of pulses will be produced only by the control code of the present invention and accordingly the flipflop 145 will be set into its ONE state only if the control code is being read out.

The flipflop 145 upon being set its ONE state produces the control signal output which is applied to the Read Write control 31. The flipflop 145 will continue to produce a control signal output for as long as it remains in its ONE state, indicative of the fact that the control code is being read out.

When the flipflop 129 is in its ZERO state it will enable a gate 147, which is connected to receive the pulses on channel 123. When a pulse is produced on channel 123 with the gate 147 enabled, the pulse will pass through the gate 147 and then through an OR gate 149 to set the flipflop 145 back to its ZERO state. Since the flipflop 129 is set into its ZERO state by pulses on channel 123 and is set into its ONE state by pulses on channel 127, a pulse will pass through the gate 147 only if a pulse preceded by a short interval follows a pulse preceded by a short interval. Two pulses in a row each preceded by a short interval will indicate that the control code is no longer being read out and accordingly the pulse passing through the gate 147 properly resets the flipflop 145 back to its ZERO state.

When the flipflop 139 is in its ONE state it also enables a gate 151, which is connected to receive pulses on channel 123. Accordingly a pulse will pass through the gate 151 only if a pulse preceded by a short interval immediately follows the setting of the flipflop 139 into its ONE state. Such a pulse would indicate that the control code is no longer being read out and accordingly such a pulse upon passing through the gate 151 will pass through the OR gate 149 to set the flipflop 145 back to its ZERO state.

A gate 153, which is connected to receive pulses from the channel 127, will be enabled only if both the flipflops 133 and 139 are in their ZERO states. Both the flipflops 133 and 139 will be in their ZERO states only if two pulses in a row are preceded by long intervals. The third pulse of such a sequence of pulses would be indicative of the fact that the control code is no longer being read out. Accordingly the third pulse of three pulses in a row produced on channel 127 will pass through the gate 153 and then through the OR gate 149 to set the flipflop 145 back to its ZERO state.

In this manner the flipflop 145 is maintained in its ONE state to produce the control signal output for only as long as the signals being read out comprise the specific control code. As soon as the reading head starts to read out information the flipflop 145 will be switched back to its ZERO state since the pulses will not be produced in the proper sequence.

A timing circuit 155 is also connected to apply a signal to the flipflop 145 to reset the flipflop 145 back to its ZERO state if no output pulses pass through the gate 141 for a predetermined interval time. The timing circuit may for example be a capacitor which is charged by the pulses passing through the gate 141 and which discharges through a resistor with the voltage on the capacitor controlling the firing of a trigger circuit, which would apply a pulse to the flipflop 145 to set the flipflop 145 back to its ZERO state. The circuit of FIG. 11 can be simplified by relying on the timing circuit alone to reset the flipflop 145 since pulses will pass through the gate 141 at a constant frequency for only as long as the control code is being read out.

The block diagram in FIG. 12 illustrates the details of the clock and information pulse separator 99. As shown in FIG. 12 pulses applied to the input of the clock and information pulse separator are applied to a gate 157 and to a gate 159. The gate 157 will normally be enabled by a signal from a monostable multivibrator 159 whenever the multivibrator 159 is in its stable state. Pulses passing through the gate 157 will be applied to the input of the multivibrator 159 and cause the multivibrator 159 to switch momentarily to its astable state. The multivibrator 159 will remain in its astable state for a time period less than the time interval between successive clock pulses but greater than one half of this time interval. While the multivibrator 159 is in its astable state it will enable the gate 159.

The first pulse applied to the input of the clock and information pulse separator will be a clock pulse. This pulse will pass through the gate 157 and cause the monostable multivibrator 159 to switch to its astable state. The clock pulse passing through the gate 157 will also be applied to the clock pulse output. If the next pulse following the clock pulse is an information pulse it will occur while the multivibrator 159 is in its astable state and accordingly will pass through the enabled gate 159 to the information pulse output. If, on the other hand, the pulse following the clock pulse passing through the gate 157 is another clock pulse, the multivibrator 159 will have switched back to its stable state so that at the time of the next clock pulse the gate 157 will again be enabled and the next clock pulse will pass through to the clock pulse output. The next pulse following an information pulse will necessarily be a clock pulse. But by the time this next pulse occurs, the monostable multivibrator 159 will have switched back to its stable state so that the gate 157 is enabled, and the clock pulse will pass through the gate 157 to the clock pulse output. In this manner the clock pulses are separated from the information pulses in the output of the pulse shaper and amplifier 83.

Thus there is described above an improved magnetic storage system for storing binary information in magnetic tracks making use of a control code which can never occur in the recorded binary information even as an error violating parity. For this reason the control code in the system of the present invention can never be confused with the recorded binary information and improved reliability is obtained.

The above description is of a preferred embodiment of the invention and many modifications may be made thereto without departing from the spirit and scope of the invention, which is defined in the appended claims.

What is claimed is:

1. A method of storing binary information comprising recording the binary information in the magnetic track in accordance with a self-clocking non-return-to-zero recording system in which adjacent flux transitions are separated along the magnetic track by intervals of a first predetermined length and by a second predetermined length longer than said first predetermined length and in which the total number of any group of intervals of said first length in a row along the magnetic track between adjacent intervals of said second length is always even, separating the recorded binary information into blocks spaced along said track, and recording in the track between said blocks a control code comprising a pattern of flux transitions in which adjacent flux transitions are spaced apart along said track by intervals of said first length and said second length and in which the total number of intervals of said first length in a row along the magnetic track between adjacent intervals of said second length is odd.

2. A method of storing binary information comprising recording the binary information in a magnetic track in accordance with a recording system in which a first set of flux transitions are recorded at regularly occurring intervals to represent clock pulses and in which a flux transition between adjacent clock-pulse-representing flux transitions represents one binary digit and the absence of a flux transition between adjacent clock-pulse representing flux transitions represents the other binary digit, separating the recorded binary information into blocks spaced along said track, and recording in the track between said blocks a control code comprising a pattern of flux transitions in which adjacent flux transitions are spaced apart along said track by intervals of a first length equal to the spacing between adjacent clock-pulse-representing transitions and a second length equal to one half of said first length and in which the total number of intervals of said length in a row along the magnetic track between adjacent intervals of said first length is odd.

3. A method of storing binary information comprising recording the binary information in the magnetic track in accordance with a self-clocking non-return-to-zero recording system in which adjacent flux transitions are spaced apart along the magnetic track by intervals of a first predetermined length and of a second predetermined length longer than said first length and in which the total number of any group of intervals of said first length in a row along the track between adjacent intervals of said second length is always even, separating the recorded binary information into blocks spaced along said track, and recording in the track between said blocks a control code comprising a repeated pattern of flux transitions in which adjacent flux transitions are spaced apart along said track by intervals of said first length and second length and in which the total number of intervals of said first length in a row between adjacent intervals of said second length is odd.

4. A method of storing binary information comprising recording the binary information in a magnetic track in accordance with a self-clocking non-return-to-zero recording system in which adjacent flux transitions are spaced apart along the magnetic track by intervals of a first predetermined length and a second predetermined length longer than said first predetermined length and in which the total number of any group of intervals of said first length in a row along the magnetic track between adjacent intervals of said second length is always even, and recording at one end of the binary information recorded in said track a control code comprising a pattern of flux transitions in which adjacent flux transitions are spaced apart along said track by intervals of said first length and said second length and in which the total number of intervals of said first length in a row between adjacent intervals of said second length is odd.

5. A system for recording binary information comprising a magnetic recording medium, transducing means operable to record on said magnetic recording medium, means to provide relative motion between said transducing means and said recording medium so that said transducing means is operable to record in a track extending along said medium, means operable to apply signals to said transducing means to record in said track binary information in accordance with a self-clocking non-return-to-zero recording system in which adjacent flux transitions are spaced apart along said track by intervals of a first predetermined length and a second predetermined length longer than said first length and in which the total number of any group of intervals of said first length in a row along said track between adjacent intervals of said second length is even, and means operable to apply signals to said transducing means to record in said track a control code comprising a pattern of flux transitions in which adjacent flux transitions are spaced apart along said track by intervals of said first and second lengths and in which the total number of intervals of said first length in a row along said track between adjacent intervals of said second length is odd.

6. A system for recording binary information comprising means defining a magnetic track, means to record in said track binary information in accordance with a self-clocking non-return-to-zero recording system in which adjacent flux transitions are spaced apart along said track by intervals of a first predetermined length and a second predetermined length longer than said first predetermined length and in which the total number of any group of intervals of said first length in a row along said track between adjacent intervals of said second length is even, and means operable to record in said track a control code comprising a pattern of flux transitions in which adjacent flux transitions are spaced apart along said track by intervals of said first and second length and in which the total number of intervals of said first length in a row along said track between adjacent intervals of said second length is odd.

7. A system for recording binary information comprising a magnetic recording medium, transducing means operable to record on said magnetic recording medium, means to provide relative movement between said transducing means and said recording medium so that said transducing means is operable to record in a track extending along said medium, means operable to apply signals to said transducing means to record in said track binary information in accordance with a self-clocking non-return-to-zero recording system in which adjacent flux transitions are spaced apart along said track by intervals of a first predetermined length and a second predetermined length longer than said first predetermined length and in which the total number of any group of intervals of said first length in a row along said track between adjacent intervals of said second length is even, and means operable to apply signals to said transducing means to record in said track a control code comprising a repeating pattern of flux transitions in which adjacent flux transitions are spaced apart along said track by intervals of said first and second lengths and in which the total number of intervals of said first length in a row along said track between adjacent intervals of said second length is odd.

8. A system for recording binary information comprising: a magnetic recording medium; transducing means operable to record on said magnetic recording medium; means to provide relative movement between said transducing means and said recording medium so that said transducing means is operable to record in a track extending along said medium; means operable to apply signals to said transducing means to record in said track a pattern of flux transitions to represent self-clocking binary information in which flux transitions spaced along said track at regular intervals represent clock pulses, a flux transition between adjacent clock-pulse-representing flux transitions represents one binary digit, and the absence of a flux transition between adjacent clock-pulse-representing flux transitions represents the other binary digit; and means operable to apply signals to said recording head to record in said track a control code comprising a pattern of flux transitions in which adjacent flux transitions are spaced apart along said track by intervals of a first length equal to one half the length between adjacent clock-pulse-representing flux transitions and a second length equal to the length between adjacent clock-pulse-representing flux transitions and in which the total number of said intervals of said first length in a row along said track between adjacent intervals of said second length is odd.

9. A magnetic storage system comprising a magnetic recording medium, transducing means operable to read out signals magnetically recorded on said medium, means to provide relative movement between said medium and said transducing means so that said transducing means reads out signals recorded in a track extending along said magnetic medium, means connected to receive the signals read out by said transducing means to interpret signals recorded in said track in a self-cocking non-return-to-zero system in which adjacent flux transitions are spaced along said track by intervals of a first length and a second length longer than said first length and in which any group of intervals of said first length in a row between adjacent intervals of said second length is always even, and means connected to receive and responsive to the signals read out by said transducing means to produce an output signal only when said transducing means has read out a predetermined pattern of flux transitions in which adjacent flux transitions are spaced apart along said track by intervals of said first and second length and in which the number of intervals of said first length in a row along said track between adjacent intervals of said second length is odd.

10. A magnetic storage system comprising a magnetic recording medium, transducing means operable to read out signals magnetically recorded on said medium, means to provide rélative movement between said medium and said transducing means so that said transducing means reads out signals recorded in a track extending along said medium, means connected to receive the signals read out by said transducing means to separate clock pulses from information pulses in signals recorded in the self-clocking non-return-to-zero recording system in which clock pulses are represented by flux transitions spaced along said track at regular intervals and one binary digit is represented by a flux transition between adjacent clock-pulse-representing flux transitions and the other binary digit is represented by the absence of flux transition between adjacent clock-pulse-representing flux transitions, and means connected to receive and responsive to the signals read out by said transducing means to produce an output signal only when said transducing means has read out a predetermined pattern of flux transitions in which adjacent flux transitions are spaced apart along the track by intervals of a first length equal to one half of the length between adjacent clock-pulse-representing flux transitions and a second length equal to the length between adjacent clock-pulse-representing flux-transitions and in which the number of intervals of said first length in a row between adjacent intervals of said second length in odd.

11. A magnetic storage system comprising a magnetic recording medium, transducing means to record applied signals on said medium and to read out signals magnetically recorded on said medium, means to provide relative movement between said medium and said transducing means so that said transducing means is operable to record signals in and read out signals from a track extending along said medium, means operable to apply signals to said transducing means to record binary information in said track in accordance with a self-clocking non-return-to-zero system in which adjacent flux transitions are spaced apart along said track by intervals of a first predetermined length and a second predetermined length longer than said first predetermined length and in which the number of any group of intervals of said first length in a row along the track between adjacent intervals of said second length is always even, means operable to apply signals to said transducing means to record a control code comprising a pattern of flux transitions in which adjacent flux transitions are spaced apart along said track by intervals of said first and second lengths and in which the number of intervals of said first length in a row along the track between adjacent intervals of said second length is odd, means connected to receive the signals read out by said transducing means to interpret the signals recorded in said track in accordance with said self-clocking non-return-to-zero recording system, and means connected to receive and responsive to the signals read out by said transducing means to produce an output signal to indicate when said transducing means is reading out a pattern of flux transitions in which adjacent flux transitions are spaced apart along the track by intervals of said first and second lengths and in which the number of intervals of said first length in a row along the track between adjacent intervals of said second length is odd.

12. A method of storing binary information comprising recording the binary information along a track in the form of transitions in the recording medium of said track in accordance with a self-clocking recording system in which adjacent transitions are separated along said track by intervals of a first predetermined length and by a second predetermined length longer than said first predetermined length and in which the total number of any group of intervals of said first length in a row along said track between adjacent intervals of said second length is always even, separating the recorded binary information into blocks spaced along said track, and recording in the track between said blocks a control code comprising a pattern of transitions in which adjacent transitions are spaced apart along said track by intervals of said first length and said second length and in which the total number of intervals of said first length in a row along said track between adjacent intervals of said second length is odd.

13. A method of recording binary information in a track in the form of transitions in the recording medium of said track in accordance with a self-clocking recording system in which a first set of transitions are recorded at regular intervals to represent the clock pulses and in which a transition between adjacent clock pulse representing transitions represents one binary digit and the absence of a transition between adjacent clock pulse representing transitions represents the other binary digit, separating the recorded binary information into blocks spaced along said track, and recording in the track between said blocks a control code comprising a pattern of flux transitions in which adjacent transitions are spaced apart along said track by intervals of a first length equal to the spacing between adjacent clock pulse representing transitions and a second length equal to one half said first length and in which the total number of intervals of said second length in a row along the track between adjacent intervals of said first length is odd.

14. A method of storing binary information comprising recording the binary information in the form of transitions in the recording medium of a track in accordance with a self-clocking recording system in which adjacent transitions are spaced apart along said track by intervals of a first predetermined length and of a second predetermined length longer than said first length and in which the total number of a group of intervals of said first length in a row along said track between adjacent intervals of said second length is always even, separating the recorded binary information into blocks spaced along said track, and recording in the track between said blocks a control code comprising a repeated pattern of transitions in which adjacent transitions are spaced apart along said track by intervals of said first length and said second length and in which the total number of intervals of said first length in a row between adjacent intervals of said second length is odd.

15. A method of storing binary information comprising recording the binary information in the form of transitions in the recording medium of a track in accordance with a self-clocking recording system in which adjacent transitions are spaced apart along said track by intervals of a first predetermined length and a second predetermined length longer than said first predetermined length and in which the total number of any group of intervals of said first length in a row along said track between adjacent intervals of said second length is always even, and recording at one end of the binary information recorded in said track a control code comprising a pattern of transitions in which adjacent transitions are spaced apart along said track by intervals of said first length and said second length and in which the total number of intervals of said first length between adjacent intervals of said second length is odd.

16. A method of storing binary information comprising recording binary information in the form of transitions in the recording medium of a recording track in accordance with a self-clocking recording system in which adjacent transitions are separated along said track by intervals of a first predetermined length and a second predetermined length longer than said first predetermined length and in which the total number of any group of intervals of said first length in a row along the track between adjacent intervals of said second length is always even, separating the recorded binary information into blocks spaced along said track, and recording in the track between said blocks a control code comprising a pattern of transitions in which adjacent transitions are spaced apart along said track by intervals of said first length and said second length, in which a plurality of intervals of said first length occur in a row between adjacent intervals of said second length, and in which the number of intervals of said first length in said plurality of intervals between adjacent intervals of said second length is odd.

17. A method of storing binary information as recited in claim 16 wherein said track is a magnetic track and wherein said transitions are non-return to zero flux transitions in said magnetic track.

References Cited

UNITED STATES PATENTS

| | | | |
|---|---|---|---|
| 3,237,176 | 2/1966 | Jenkins | 340—174.1 |
| 3,382,492 | 5/1968 | Santana | 340—174.1 |

BERNARD KONICK, *Primary Examiner.*

VINCENT P. CANNEY, *Assistant Examiner.*

U.S. Cl. X.R.

346—74